United States Patent
Hall et al.

(10) Patent No.: US 7,862,126 B2
(45) Date of Patent: Jan. 4, 2011

(54) METHOD OF PROVIDING A DEGRADATION DRUM

(76) Inventors: David R. Hall, 2185 S. Larsen Pkwy., Provo, UT (US) 84606; Tyson J. Wilde, 2185 S. Larsen Pkwy., Provo, UT (US) 84606; Jad A. Mills, 2185 S. Larsen Pkwy., Provo, UT (US) 84606

( * ) Notice: Subject to any disclaimer, the term of this patent is extended or adjusted under 35 U.S.C. 154(b) by 510 days.

(21) Appl. No.: 11/969,805

(22) Filed: Jan. 4, 2008

(65) Prior Publication Data

US 2008/0120163 A1 May 22, 2008

Related U.S. Application Data

(63) Continuation of application No. 11/747,377, filed on May 11, 2007, now Pat. No. 7,390,066, which is a continuation of application No. 11/747,357, filed on May 11, 2007, now Pat. No. 7,387,345, which is a continuation-in-part of application No. 11/742,261, filed on Apr. 30, 2007, now Pat. No. 7,469,971, which is a continuation-in-part of application No. 11/464,008, filed on Aug. 11, 2006, now Pat. No. 7,338,135, which is a continuation-in-part of application No. 11/463,998, filed on Aug. 11, 2006, now Pat. No. 7,384,105, which is a continuation-in-part of application No. 11/463,990, filed on Aug. 11, 2006, now Pat. No. 7,320,505, which is a continuation-in-part of application No. 11/463,975, filed on Aug. 11, 2006, now Pat. No. 7,445,294, which is a continuation-in-part of application No. 11/463,962, filed on Aug. 11, 2006, now Pat. No. 7,413,256, which is a continuation-in-part of application No. 11/463,953, filed on Aug. 11, 2006, application No. 11/969,805, which is a continuation-in-part of application No. 11/695,672, filed on Apr. 3, 2007, now Pat. No. 7,396,086, which is a continuation-in-part of application No. 11/686,831, filed on Mar. 15, 2007, now Pat. No. 7,568,770.

(51) Int. Cl.
*E01C 23/00* (2006.01)
(52) U.S. Cl. .......................................... 299/95
(58) Field of Classification Search .................. 299/95
See application file for complete search history.

(56) References Cited

U.S. PATENT DOCUMENTS

| | | | | |
|---|---|---|---|---|
| 5,434,775 A * | 7/1995 | Sims et al. | ..................... | 705/8 |
| 6,485,104 B1 * | 11/2002 | Keller | ....................... | 299/81.3 |
| 2003/0110667 A1 * | 6/2003 | Adachi et al. | ................. | 37/348 |

* cited by examiner

*Primary Examiner*—John Kreck
(74) *Attorney, Agent, or Firm*—Tyson J. Wilde; Jad. A. Mills; Phillip W. Townsend, III

(57) ABSTRACT

In one aspect of the invention a degradation drum comprises a generally cylindrical body comprising inner and outer diameters. At least one degradation assembly is disposed on the outer diameter and it comprises a holder and a pick shank secured within a bore of the holder. At least one lubricant reservoir is disposed within the inner diameter and is in fluid communication with the bore of the holder through a fluid pathway. In some embodiments, the lubricant reservoir maintains a fluid pressure on the pick shank.

19 Claims, 10 Drawing Sheets

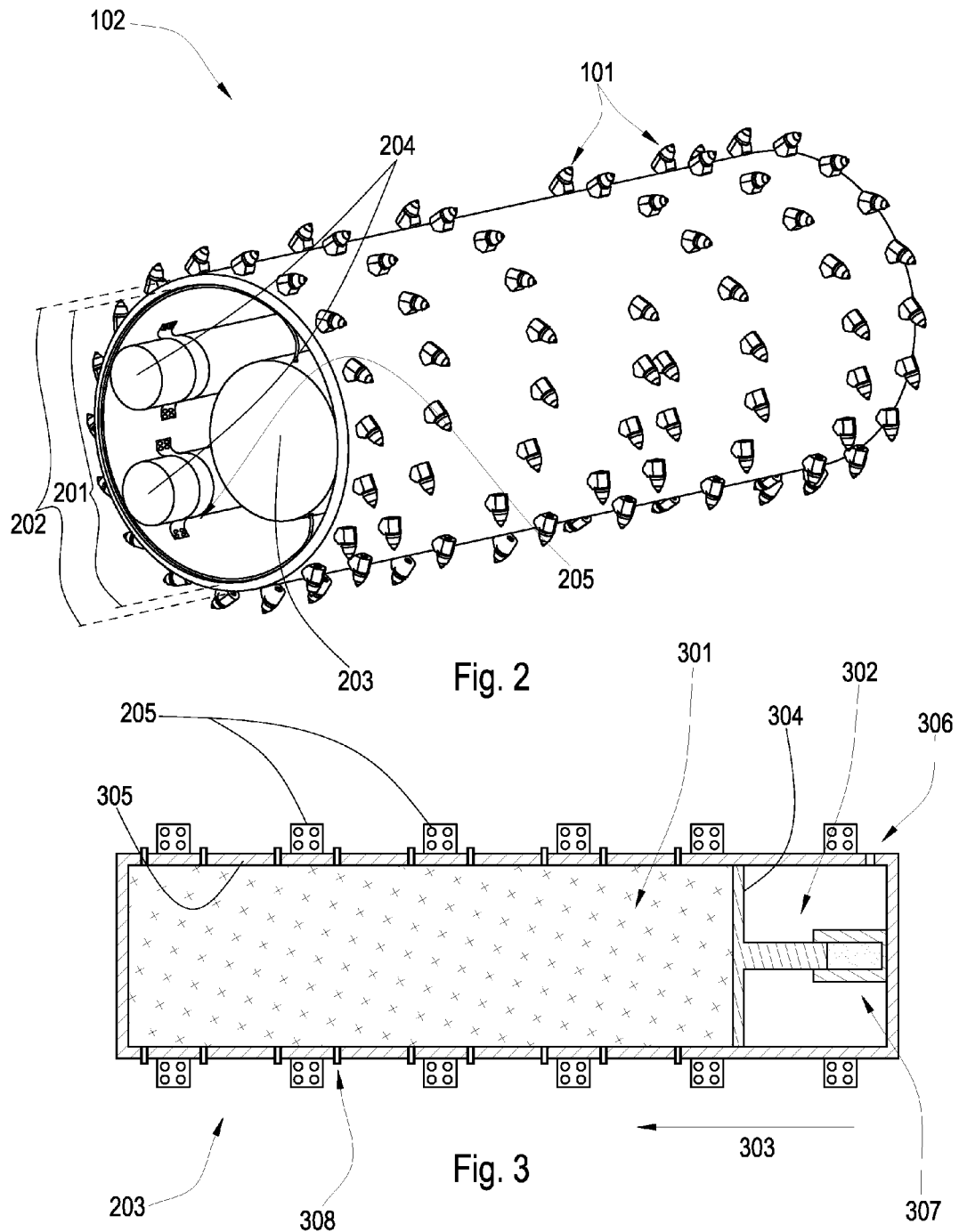

1300

```
┌─────────────────────────────────────────────┐
│   Provide a degradation drum comprising inner and │
│ outter diameters and a lubricant reservoir disposed with │
│           the inner diameter.               │
│                                        1301 │
└─────────────────────────────────────────────┘
                      │
┌─────────────────────────────────────────────┐
│  Attach a plurality of degradation assemblies to the │
│   outer diameter of the drum such that the assemblies │
│  are in fluid communication with the lubricant reservoir │
│            through a fluid pathway.         │
│                                        1302 │
└─────────────────────────────────────────────┘
                      │
┌─────────────────────────────────────────────┐
│  Maintain a substantially constant pressure through the │
│    fluid pathway on the degradation assemblies. │
│                                        1303 │
└─────────────────────────────────────────────┘
```

Provide by a first party to a second party a generally cylindrical degradation drum comprising inner and outer diameters and a plurality of degradation assemblies disposed on the outer diameter. The plurality of degradation assemblies each comprising a pick body intermediate an impact tip and a pick shank, the pick shank deing disposed within a bore of a holder. 1401

Change the second party by the first party for use of the drum.

METHOD OF PROVIDING A DEGRADATION DRUM

CROSS REFERENCE TO RELATED APPLICATIONS

This application is a continuation of U.S. patent application Ser. No. 11/747,377 filed on May 11, 2007 now U.S. Pat. No. 7,390,066 which was a continuation of U.S. patent application Ser. No. 11/747,357 which was filed on May 11, 2007 now U.S. Pat. No. 7,387,345 and entitled Lubricating Drum. U.S. patent application Ser. No. 11/747,357 is a continuation-in-part of U.S. patent application Ser. No. 11/742,261 which was filed on Apr. 20, 2007 now U.S. Pat. No. 7,469,971 and entitled Lubricated Pick. U.S. patent application Ser. No. 11/742,261 is a continuation-in-part of U.S. patent application Ser. No. 11/464,008 which was filed on Aug. 11, 2006 now U.S. Pat. No. 7,338,135 and entitled Holder for a Degradation Assembly. U.S. patent application Ser. No. 11/464,008 is a continuation-in-part of U.S. patent application Ser. No. 11/463,998 which was filed on Aug. 11, 2006 now U.S. Pat. No. 7,384,105 and entitled Washer for a Degradation Assembly. U.S. patent application Ser. No. 11/463,998 is a continuation-in-part of U.S. patent application Ser. No. 11/463,990 which was filed on Aug. 11, 2006 now U.S. Pat. No. 7,320,505 and entitled An Attack Tool. U.S. patent application Ser. No. 11/463,990 is a continuation-in-part of U.S. patent application Ser. No. 11/463,975 which was filed on Aug. 11, 2006 now U.S. Pat. No. 7,445,294 and entitled An Attack Tool. U.S. patent application Ser. No. 11/463,975 is a continuation-in-part of U.S. patent application Ser. No. 11/463,962 which was filed on Aug. 11, 2006 now U.S. Pat. No. 7,413,256 and entitled An Attack Tool. U.S. patent application Ser. No. 11/463,962 is a continuation-in-part of U.S. patent application Ser. No. 11/463,953, which was also filed on Aug. 11, 2006 and entitled An Attack Tool. The present application is also a continuation-in-part of U.S. patent application Ser. No. 11/695,672 which was filed on Apr. 3, 2007 now U.S. Pat. No. 7,396,086 and entitled Core for a Pick. U.S. patent application Ser. No. 11/695,672 is a continuation-in-part of U.S. patent application Ser. No. 11/686,831 filed on Mar. 15, 2007 now U.S. Pat. No. 7,568,770 and entitled A Superhard Composite Material Bonded to a Steel Body. All of these applications are herein incorporated by reference for all that it contains.

BACKGROUND OF THE INVENTION

Many industries including the asphalt, mining, construction, drilling, and excavation industries utilize a plurality of picks incorporated into drums. In asphalt milling, a drum supporting an array of picks may rotate such that the picks engage a paved surface causing it to break up. Examples of degradation assemblies from the prior art are disclosed in U.S. Pat. No. 6,824,225 to Stiffler, US Pub. No. 20050173966 to Mouthaan, U.S. Pat. No. 6,692,083 to Latham, U.S. Pat. No. 6,786,557 to Montgomery, Jr., U.S. Pat. No. 3,830,321 to McKenry et al., US. Pub. No. 20030230926, U.S. Pat. No. 4,932,723 to Mills, US Pub. No. 20020175555 to Merceir, U.S. Pat. No. 6,854,810 to Montgomery, Jr., U.S. Pat. No. 6,851,758 to Beach, which are all herein incorporated by reference for all they contain.

The picks typically have a tungsten carbide tip. Efforts have been made to extend the life of these picks. Examples of such efforts are disclosed in U.S. Pat. No. 4,944,559 to Sionnet et al., U.S. Pat. No. 5,837,071 to Andersson et al., U.S. Pat. No. 5,417,475 to Graham et al., U.S. Pat. No. 6,051,079 to Andersson et al., and U.S. Pat. No. 4,725,098 to Beach, U.S. Pat. No. 6,733,087 to Hall et al., U.S. Pat. No. 4,923,511 to Krizan et al., U.S. Pat. No. 5,174,374 to Hailey, and U.S. Pat. No. 6,868,848 to Boland et al., all of which are herein incorporated by reference for all that they disclose.

BRIEF SUMMARY OF THE INVENTION

In one aspect of the invention a degradation drum comprises a generally cylindrical body comprising inner and outer diameters. At least one degradation assembly is disposed on the outer diameter and it comprises a holder and a pick shank secured within a bore of the holder. At least one lubricant reservoir is disposed within the inner diameter and is in fluid communication with the bore of the holder through a fluid pathway. In some embodiments, the lubricant reservoir maintains a fluid pressure on the pick shank. The reservoir may fill the entire inner diameter of the drum or a container may be secured within the inner diameter which holds the lubricant. A pump, spring, compressed air, gravity or a combination thereof may be used to supply the lubricant to the degradation assemblies.

The pick shank may be attached to a pick body adjacent a distal end of the holder, and an impact tip comprising a diamond surface may be attached to the pick body opposite the shank. The diamond surface may comprise diamond, polycrystalline diamond, refractory metal bonded diamond, silicon bonded diamond, layered diamond, infiltrated diamond, thermally stable diamond, natural diamond, vapor deposited diamond, physically deposited diamond, diamond impregnated matrix, diamond impregnated carbide, cemented metal carbide, chromium, titanium, aluminum, tungsten, or combinations thereof. The impact tip may disposed on a carbide core that is press fit into a cavity in the pick body.

The drum may be part of a pavement milling machine, a mining machine, or combinations thereof. The lubricant reservoir may be counterbalanced by one or more weights disposed within and attached to the inner diameter of the drum body. The fluid pressure from the reservoir on the pick shank may be maintained by the use of a spring, a compressed gas, or combinations thereof. The fluid pathway between the reservoir and the bore of the holder may comprise a fluid hose disposed within the inner diameter of the drum. The fluid pathway between the reservoir and the bore of the holder may comprise a channel disposed intermediate the inner and outer diameters. The channel may extend longitudinally or radially through the body of the drum.

The lubricant reservoir may comprise a filling port that is accessible from outside of the drum. Some embodiments of the invention may comprise a plurality of lubricant reservoirs disposed within the inner diameter of the drum. The drum may comprise a plurality of degradation assemblies disposed on its outer diameter. In some embodiments of the invention at least two of the plurality of degradation assemblies may share a common fluid pathway to the lubricant reservoir. The lubricant reservoir may comprise an accumulator element.

A lubricant originating from the reservoir may be substantially retained within the bore by a distal seal assembly. The holder may comprise a lubricant pressurizing mechanism. A one-way check valve may be disposed proximate a junction of the holder and the drum. The valve may substantially limit the movement of lubricant from the holder into the drum.

In another aspect of the invention, a method for lubricating a degradation assembly comprises a step of providing a degradation drum comprising inner and outer diameters and a lubricant reservoir disposed within the inner diameter. The method further comprises a step of attaching a plurality of degradation assemblies to the outer diameter of the drum such that the assemblies are in fluid communication with the lubricant reservoir through a fluid pathway. The method further comprises a step of maintaining a substantially constant pressure through the fluid pathway on the degradation assemblies.

BRIEF DESCRIPTION OF THE DRAWINGS

FIG. 2 is a perspective diagram of an embodiment of a drum.

FIG. 3 is a cross-sectional diagram of an embodiment a lubricant reservoir.

FIG. 13 is a flowchart illustrating a method for lubricating a degradation assembly.

FIG. 14 is a flowchart illustrating a method for providing a cost effective degradation drum.

DETAILED DESCRIPTION OF THE INVENTION AND THE PREFERRED EMBODIMENT

Figure 1:
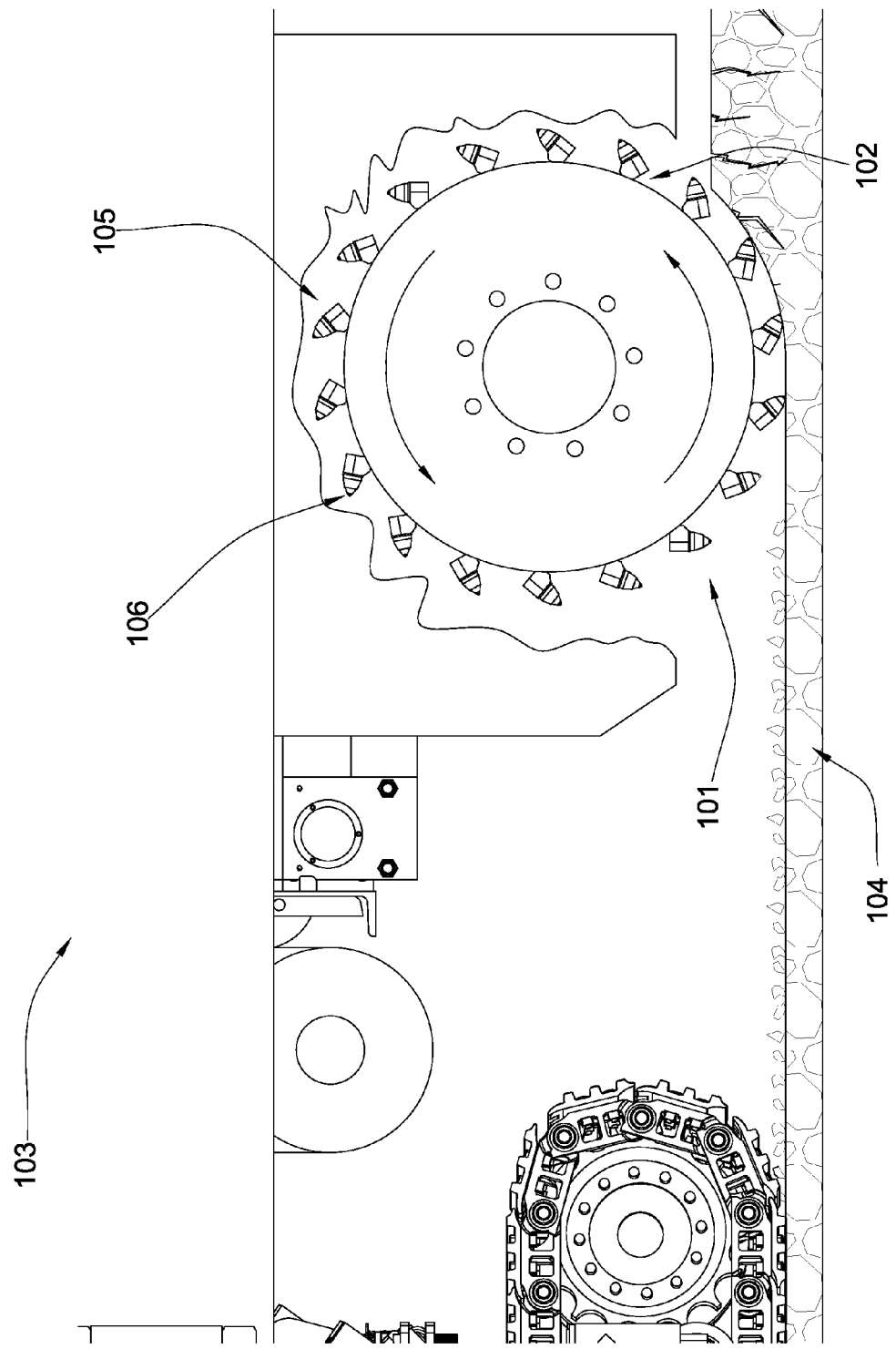
FIG. 1 is a cross-sectional diagram of an embodiment of an pavement milling machine.

FIG. 1 is a cross-sectional diagram of an embodiment of a plurality of degradation assemblies 101 attached to a rotating drum 102 connected to the underside of a pavement milling machine 103. The milling machine 103 may be a cold planer used to degrade man-made formations such as pavement 104 prior to the placement of a new layer of pavement. Degradation assemblies 101 may be attached to the drum 102 at an angle, thereby bringing the degradation assemblies 101 into engagement with the formation 104 at the desired level of aggressiveness. A holder 105 may comprise a block 107. In some embodiments the holder 105 may comprise an extension inserted into a block 107. The holder 105 is attached to the rotating drum 102, and a pick 106 is inserted into the holder. As the drum 102 rotates in the direction shown by the arrows, the picks 106 temporarily contact the pavement 104. The impact from this contact causes the degradation of the pavement 104, as well as eventually wearing the picks 106. Drums 102 according to the present invention may also be used in mining machines, trenching machines, and in other applications.

FIG. 2 is a perspective diagram of an embodiment of a drum 102. The drum comprises an inner diameter 201 and an outer diameter 202. A plurality of degradation assemblies 101 is disposed on the outer diameter 202. A lubricant reservoir 203 is disposed within the inner diameter 201. The reservoir 203 is counterbalanced by weights 204 also disposed within the inner diameter 201. The weights 204 and the reservoir 203 may be attached to the drum 102 using bolted brackets 205 or by some other means. The mass and placement of the weights 204 may be adjusted to balance the mass of the reservoir. Is some embodiments of the invention the mass or placement of the weights 204 may be adjustable while the drum is in use. The weights may be tanks filled with a liquid or some other substance. If the lubricant reservoir 203 decreases in mass by decreasing the amount of lubricant held within the reservoir 203, the liquid or other balancing material may be extruded from the weights through an escape port in the drum (not shown). In some embodiments of the invention the drum 102 is balanced by filling the non-reservoir volume of the inner diameter 201 with a liquid.

FIG. 3 gives a cross-sectional view of an embodiment of a lubricant reservoir 203. The reservoir 203 may comprise a lubricant 301 and an accumulator element 302. The accumulator element may comprise a compressed gas cylinder 307, which may exert a roughly constant force 303 on a plunger 304 that fits tightly in the reservoir 203. The plunger 304 restricts the lubricant 301 to a limited volume of the reservoir 203. The position of the plunger 304 may be determined by a ratio of pressure on the lubricant 301 in the reservoir 203 to the force 303 exerted by the compressed gas cylinder 307 on the plunger 304. In some embodiments of the invention a spring may be serve as accumulator elements 302 and may exert a roughly constant force 303 on the lubricant 301. A vent 306 may allow air or liquid to diffuse freely into the accumulator element 302 in order to avoid a suction effect which may affect the movement of the plunger. One or more fluid ports 308 may extend along a length of the reservoir 203 and facilitate the connection of fluid hoses 402 to the reservoir 203.

Figure 4:
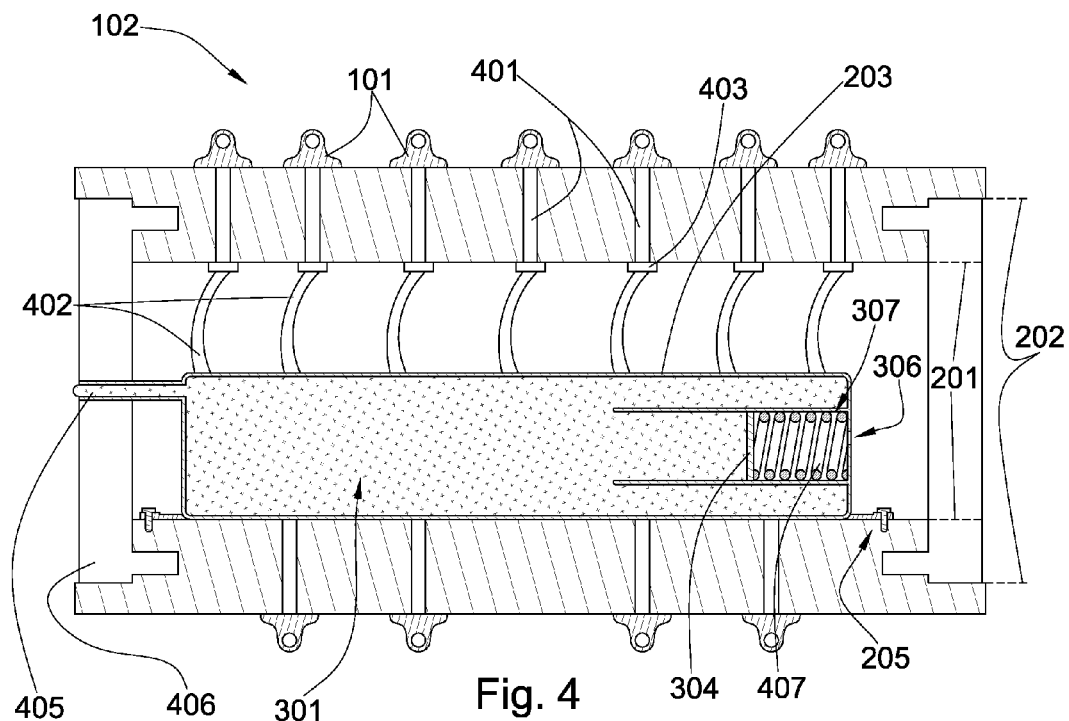
FIG. 4 is a cross-sectional diagram of an embodiment of drum.

Referring now to FIG. 4, a cross-sectional view of an embodiment of a drum 102 discloses a single lubricant reservoir 203 disposed within the inner diameter 201 of the drum 102. A plurality of radial channels 401 are disposed intermediate the inner and outer diameters 201, 202 of the drum. The radial channels 401 allow fluid communication between the reservoir 203 and the plurality of degradation assemblies 101 disposed on the outer diameter 202. A plurality of fluid hoses 402 is also disposed within the inner diameter 201 of the drum 102. Each of the plurality of fluid hoses 402 leads from the reservoir 203 to at least one radial channel 401. A connector 403 may join a fluid hose 402 and a radial channel 401. Each radial channel 401 extends radially through the body 404 of the drum to at least one degradation assembly 101. As disclosed in FIG. 3, an accumulator element 307 may maintain a roughly constant pressure on the lubricant 301. In the present embodiment the accumulator element 307 comprises a spring 407. The compressive force of the accumulator element 307 is believed to maintain a roughly constant pressure on lubricant 301 traveling to and retained within the bores of the degradation assemblies 101. Although in FIG. 4 a plurality of fluid hoses 402 are shown, in some embodiments of the invention the fluid pathway of every degradation assembly 101 may comprise the same, single fluid hose 402. The reservoir 203 comprises a filling port 405. The filling port 405 may extend from the reservoir 203 and through the center of a circular drum cap 406. The filling port 405 may be accessible without removing the drum cap 406. This may allow for filling of the reservoir 203 during operation of the drum 102. In some embodiments an interface between a lubricant filling hose (not shown) and the filling port 405 may be adapted to maintain the integrity of the filling hose-filling port connection while allowing the filling port 405 to rotate with the drum 102.

Figure 5:
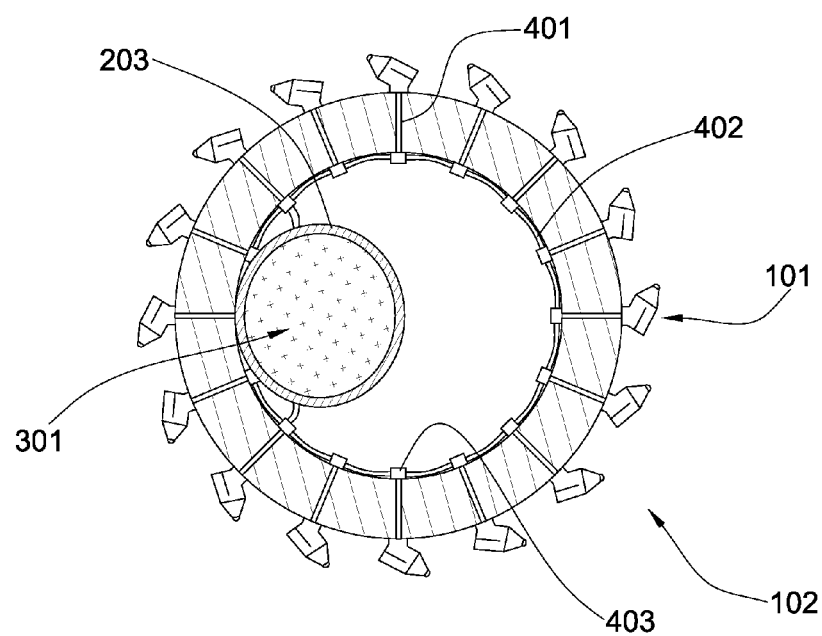
FIG. 5 is a cross-sectional diagram of another embodiment of drum.

FIG. 5 discloses another cross-sectional view of the drum 102. A circumferential fluid hose 402 extends from the reservoir 203 to a series of degradation assemblies 101. Each assembly 101 is connected to fluid hose 402 by its own respective radial channel 401 and connector 403. In some embodiments of the invention multiple degradation assemblies 101 may share a connector 403 and may share part of the same radial channel 401. Although only one fluid hose 402 is shown in FIG. 5, a plurality of fluid hoses 402 may each extend from the reservoir 203 to degradation assemblies 101. FIG. 5 also discloses radial channels 401 adjacent the reservoir 203 that connect directly to the reservoir. In some embodiments the adjacent radial channels 401 may still use one or more connectors 403.

Figure 6:
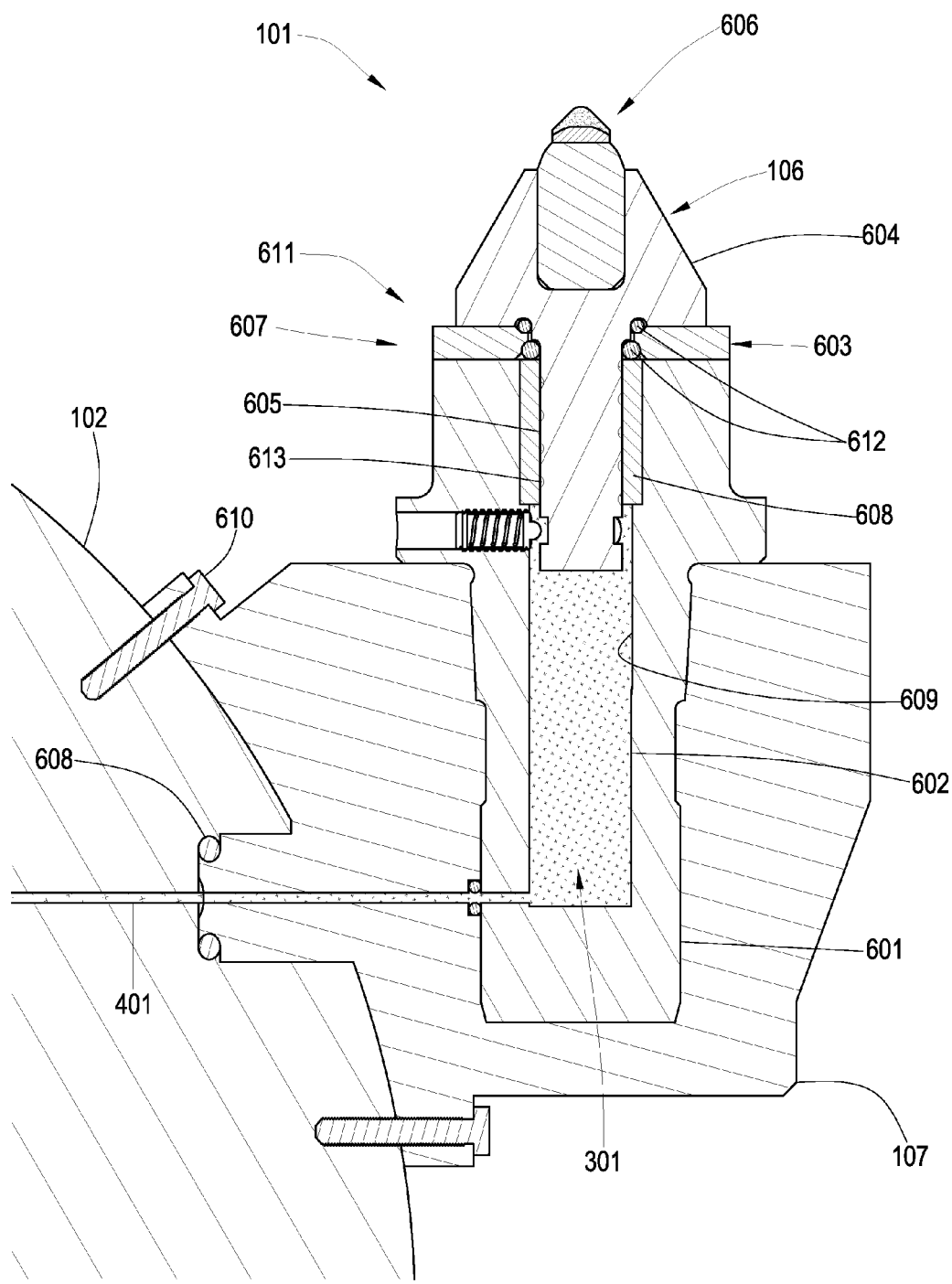
FIG. 6 is cross-sectional diagram of an embodiment of a degradation assembly.

FIG. 6 discloses a cross-sectional view of a degradation assembly 101 attached to a drum 102 in which the holder 105 comprises an extension 602 fit into a block 107. The extension 601 is complementary to the block 107, and the block is connected to the drum 102 using bolts 610. The holder 105 comprises a bore 602. The degradation assembly 101 comprises a pick 106 and a washer 603. The pick 106 comprises a steel pick body 604 disposed intermediate a shank 605 and an impact tip 606. The shank 605 extends into a distal end 607 of the bore 602. As the degradation assembly 101 engages the formation 104, the pick 106 may be adapted to rotate within the bore 602. This rotation is believed to cause the pick 106 to wear evenly and extend the life of the pick 106. If aggregate (not shown) accumulates between the pick 106 and the holder 105, this aggregate may increase friction between them and cause the pick 106 to cease rotation. A bushing 608 may be placed between the shank 605 and an inner surface 609 of the bore 602. This is believed to allow low-friction rotation of the shank 605 with respect to the holder 105. The bushing 608 may comprise a cemented metal carbide material, a hardened steel, coated steel, metal bonded diamond particles, CVD or PVD diamond or cubic boron nitride. In some embodiments of the invention, the bushing comprises graphite, or a laminated graphite, such as Graphfoil®.

The lubricant 301 from the lubricant reservoir 203 may further facilitate low-friction rotation of the pick 106. One or more grooves 613 may extend along the shank 605 in a spiral pattern. The spiral groove 613 is believed to facilitate the transfer of lubricant 301 along the shank 605. The lubricant 301 may be substantially retained within the bore 602 by a distal seal assembly 611. The seal assembly 611 may comprise a pick 106, a washer 603, and one or more o-rings 612 disposed between the washer 603 and the pick 106. The seal assembly 611 may substantially retain the lubricant 301 within the bore 602. Some lubricant 301 may still extrude from the distal end 607 of the bore 602. As the lubricant 301 is extruded from the bore 602, more lubricant 301 from the reservoir 203 may enter the bore 602 through the fluid hoses 402 or radial channels 401.

Figure 7:
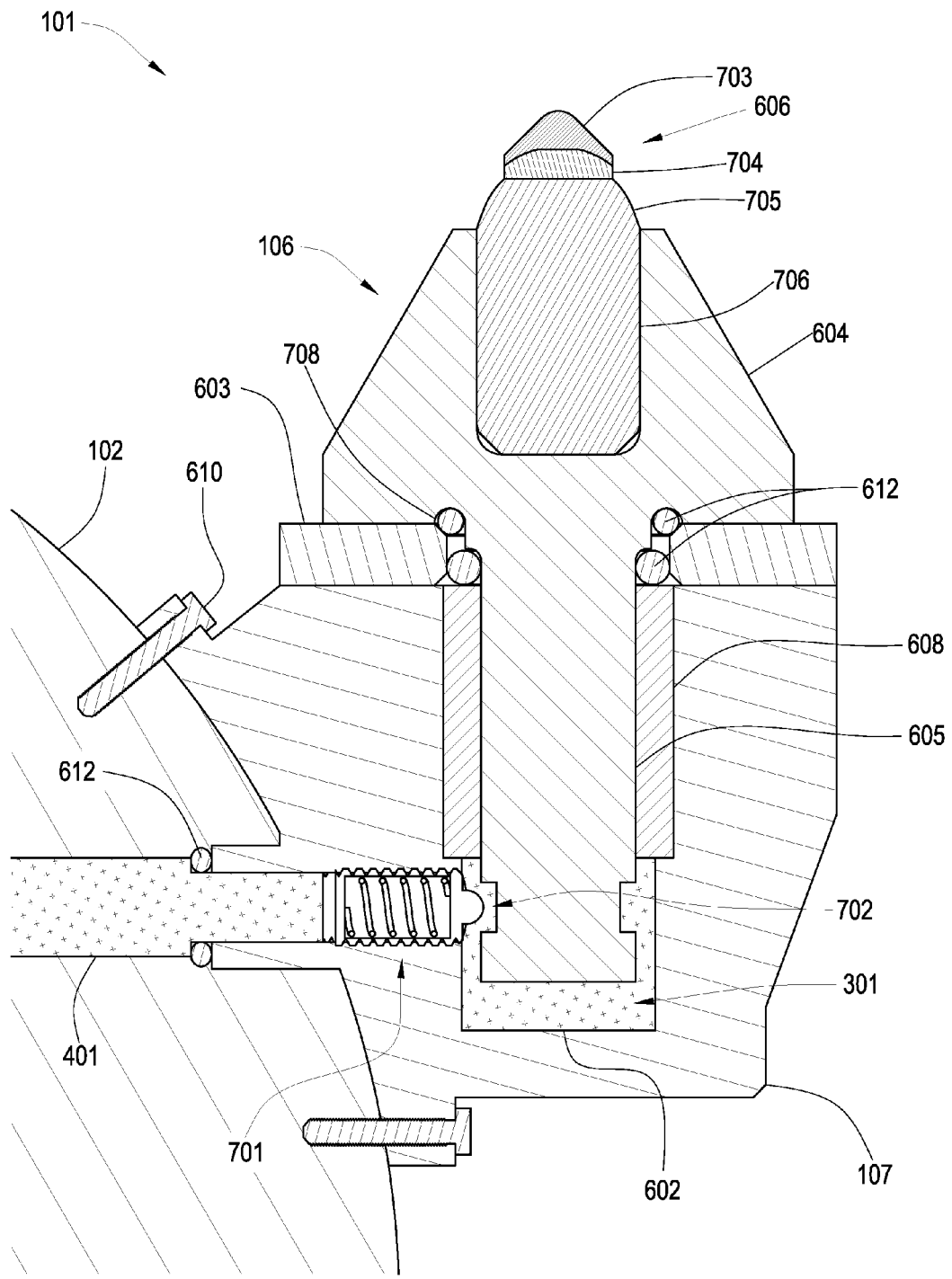
FIG. 7 is cross-sectional diagram of another embodiment of a degradation assembly.

FIG. 7 discloses an embodiment of the invention where the holder 105 comprises a block 107 that is attached directly to the drum 102. The lubricant 301 may travel to the bore 602 of the holder 105 through a radial channel 401. O-rings 612 may be disposed proximate the channel 401 near a junction of the drum 102 and the holder 105. O-rings 612 may also be disposed between the washer 603 and the shank 605. The channel 401 may be disposed in or around a spring-loaded protrusion 701 disposed in the bore 602 of the holder 105. One or more spring-loaded protrusions 701 may be adapted to retain the shank 605 within the bore 602. The protrusion 701 may retract when the shank 605 is inserted into the holder 105, and then spring into a recess 702 in the shank 605 when the recess 702 is proximate the protrusion 701, thus retaining the shank 605 within the bore 602. In some embodiments of the invention the shank 605 may be retained in the holder by a resilient keep ring or snap ring.

FIG. 7 also discloses the pick 106 comprising a pick body 604, which is generally made of steel. The body 604 is disposed intermediate a shank 605 and an impact tip 606. The impact tip 606 comprises a diamond impact surface 703. The diamond surface 703 may comprise a material selected from the group consisting of diamond, polycrystalline diamond, cubic boron nitride, refractory metal bonded diamond, silicon bonded diamond, layered diamond, infiltrated diamond, thermally stable diamond, natural diamond, vapor deposited diamond, physically deposited diamond, diamond impregnated matrix, diamond impregnated carbide, cemented metal carbide, chromium, titanium, aluminum, tungsten, or combinations thereof. The material may comprise a polycrystalline structure with an average grain size of 10 to 100 microns and in some embodiments the material may be at least 0.100 inches thick. In embodiments, where the material comprises a ceramic, the diamond surface 703 may comprise a region that is free of binder material.

The diamond may be bonded to the carbide substrate 704 through a high temperature high pressure process. During high temperature high pressure (HTHP) processing, some of the cobalt from the carbide substrate may infiltrate into the material such that the substrate 704 comprises a slightly lower cobalt concentration than before the HTHP process. The diamond surface 703 may preferably comprise a 1 to 5 percent cobalt concentration by weight after the cobalt or other binder infiltrates the material. The material may also comprise a 1 to 5 percent concentration of tantalum by weight. Other binders that may be used with the present invention include iron, cobalt, tungsten, nickel, silicon, carbonates, hydroxide, hydride, hydrate, phosphorus-oxide, phosphoric acid, carbonate, lanthanide, actinide, phosphate hydrate, hydrogen phosphate, phosphorus carbonate, alkali metals, ruthenium, rhodium, niobium, palladium, chromium, molybdenum, manganese, tantalum or combinations thereof. In some embodiments, the binder is added directly to the material's mixture before the HTHP processing so that sintering does not rely on the binder migrating from the substrate into the mixture. In some embodiments the impact tip 606 may be bonded to a cemented metal carbide core 705 prior to the core 705 being press fit into a cavity 706 of the pick body 604. Typically the substrate 704 of the impact tip 606 is brazed to the core 705 at a planar interface. The tip 606 and the core 705 may be brazed together with a braze comprising a melting temperature from 700 to 1200 degrees Celsius. In some embodiments of the invention the carbide core 705 may be brazed into the cavity 706. Some picks 106 may comprise a carbide bolster attached at one end to the pick body 604 and at a second end to the impact tip 606. Such a pick that may be compatible with the present invention is disclosed in U.S. patent application Ser. No. 11/686,831 by Hall et al., filed on Mar. 15, 2007. In such an embodiment the impact tip 606 may be bonded directly to the bolster or to the carbide core 705.

The diamond surface 703 may comprise a substantially pointed geometry with a sharp apex comprising a radius of 0.050 to 0.200 inches. In some embodiments, the radius is 0.090 to 0.110 inches. It is believed that the apex may be adapted to distribute impact forces, which may help to prevent the diamond surface 703 from chipping or breaking. The surface 703 may comprise a thickness of 0.100 to 0.500 inches from the apex to an interface with the substrate 704, preferably from 0.125 to 0.275 inches. The surface 703 and the substrate 704 may comprise a total thickness of 0.200 to 0.700 inches from the apex to the core 705. The sharp apex may allow the high impact resistant pick 106 to more easily cleave asphalt, rock, or other formations.

The shank 605 may be coated with a hard surface. The hard surface may comprise a cemented metal carbide, chromium, manganese, nickel, titanium, silicon, hard surfacing, diamond, cubic boron nitride, polycrystalline diamond, diamond impregnated carbide, diamond impregnated matrix, silicon bonded diamond, deposited diamond, aluminum oxide, zircon, silicon carbide, whisker reinforced ceramics, nitride, stellite, or combinations thereof. The hard surface may be bonded to the shank 605 through the processes of electroplating, cladding, electroless plating, thermal spraying, annealing, hard facing, applying high pressure, hot dipping, brazing, or combinations thereof. The hard surface may comprise a thickness of 0.001 to 0.200 inches. The hard surface may be polished.

A reentrant 708 may be formed on the pick body 604 or the shank 605 near a junction of the shank 605 and the pick body 604. It is believed that placing the reentrant 708 near the junction may relieve strain on the junction caused by impact forces. The reentrant 708 may increase the flexibility of the junction. In some embodiments of the invention a plurality of reentrants 708 may be formed near the junction.

Figure 8:
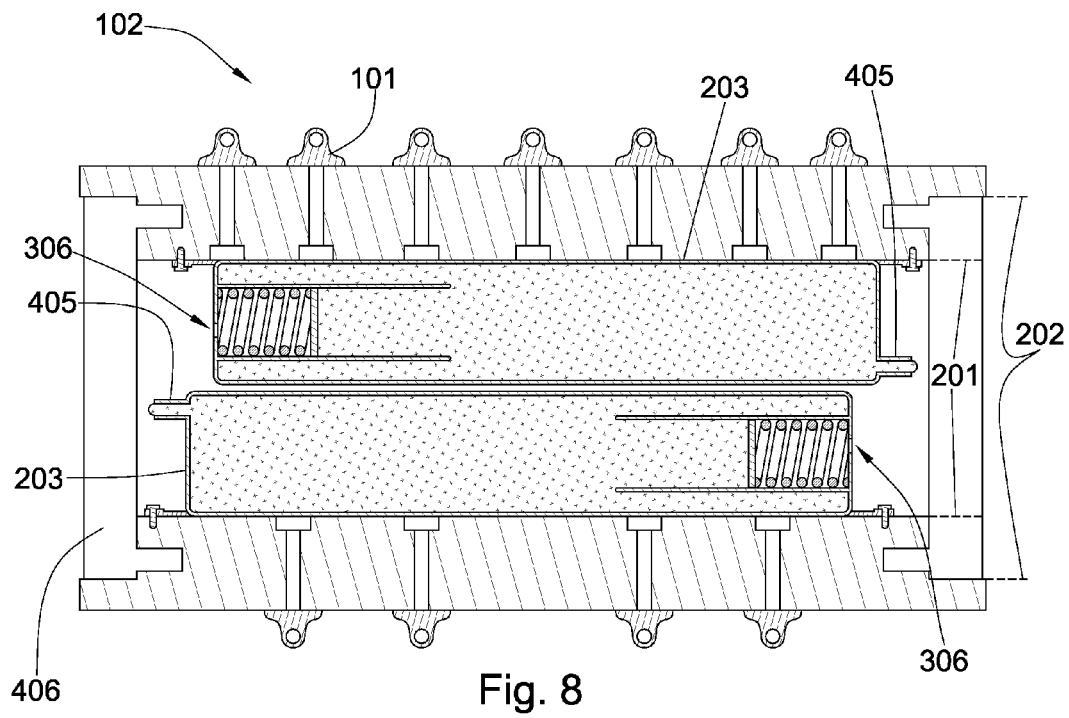
FIG. 8 is a cross-sectional diagram of another embodiment of drum.
Figure 9:
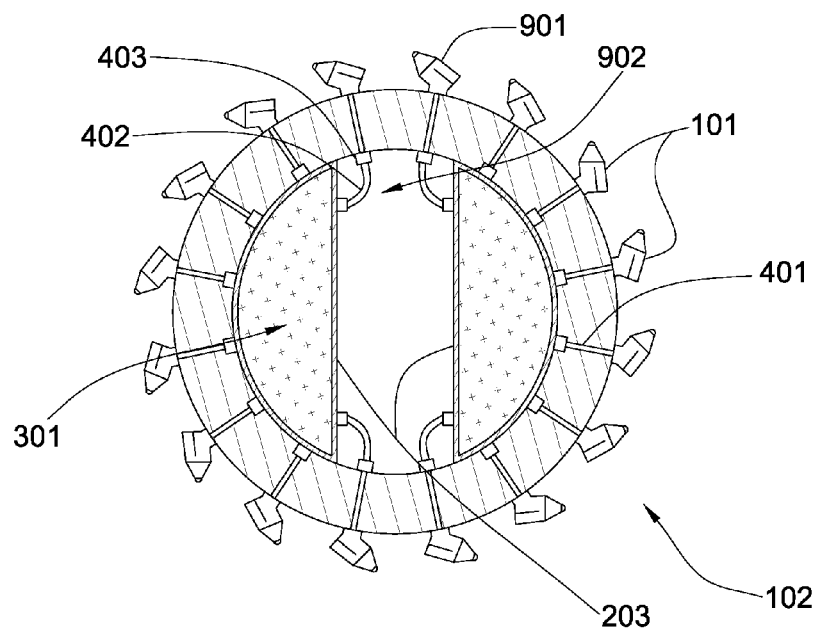
FIG. 9 is a cross-sectional diagram of another embodiment of drum.

Referring now to FIG. 8, a plurality of lubricant reservoirs 203 is disposed within the inner diameter 201 of the drum 102. The placement of the plurality of reservoirs 203 may balance the drum 102. In some embodiments of the invention the filling port 405 may not extend outside the drum 102, and the drum cap 406 may have to be removed in order to fill the reservoir 203. The plurality of reservoirs 203 may increase the volume of lubricant that can be stored inside the drum 102, thereby decreasing the frequency of required filling of the reservoir 203. Whereas FIG. 8 discloses a longitudinal cross-sectional diagram of a drum 102, FIG. 9 discloses a radial cross-sectional diagram of an embodiment of a drum 102. Most of the degradation assemblies 101 connect directly to the reservoir 203 through a radial channel 401. Select degradation assemblies 901 may be connected to a reservoir 203 via a fluid pathway 902 comprising a radial channel 401, one or more fluid hoses 402, and one or more connectors 403. The use of multiple connectors 403 and/or fluid hoses 402 for select assemblies 901 may allow at least one of the degradation assemblies 101 to comprise a different fluid pathway 902 to the reservoir 203 from the rest of the assemblies 101. Degradation assemblies 901 with a separate fluid pathway 902 may be resistant to system-wide pathway blockages. Fluid pathways 902 may comprise channels 401, 1001, fluid hoses 402, or combinations thereof.

Figure 10:
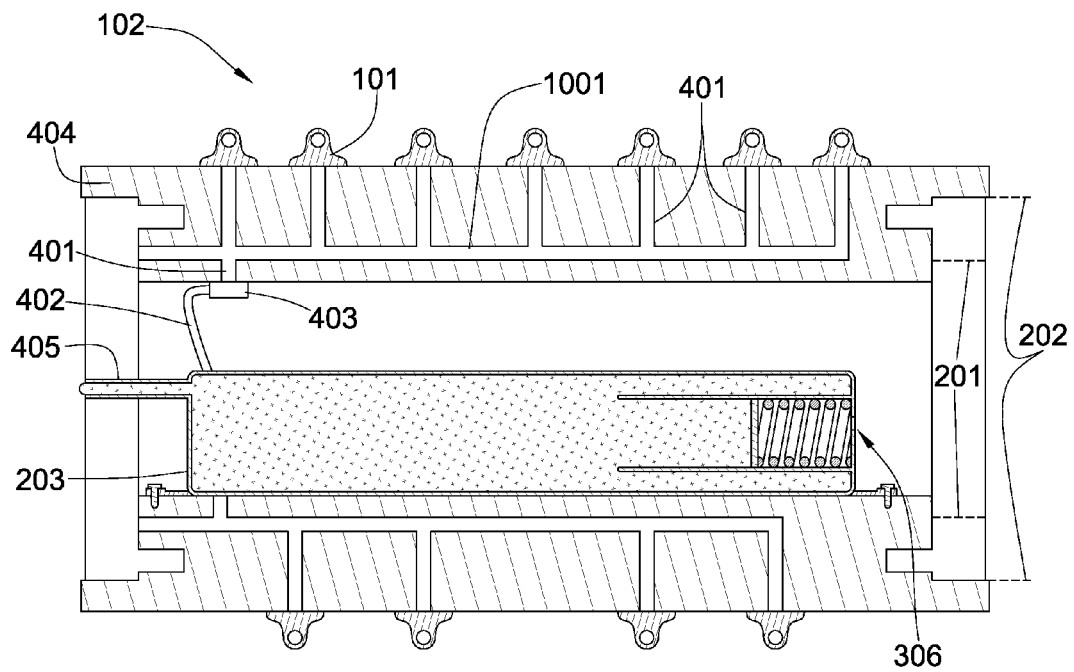
FIG. 10 is a cross-sectional diagram of another embodiment of drum.
Figure 11:
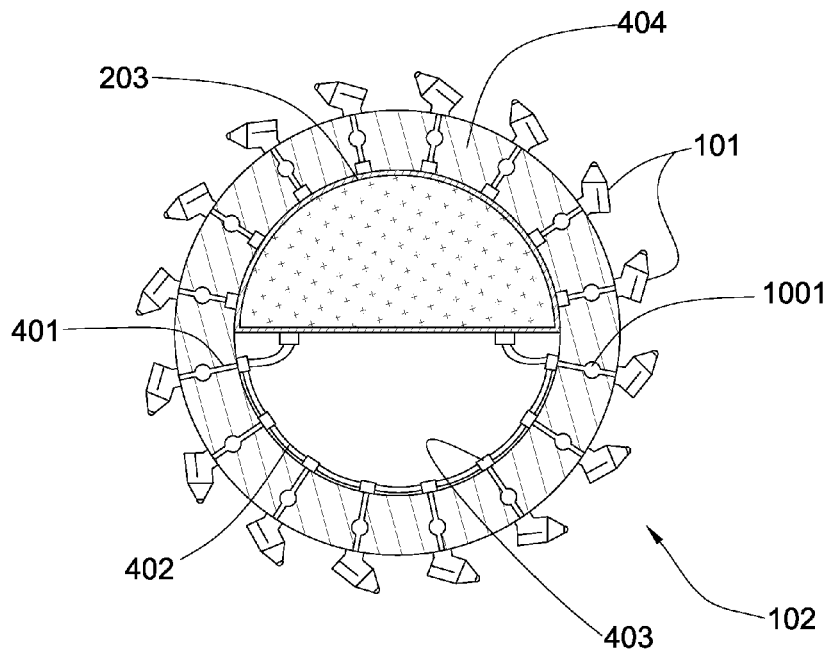
FIG. 11 is a cross-sectional diagram of another embodiment of drum

FIGS. 10 and 11 disclose embodiments of the invention in which longitudinal channels 1001 extend longitudinally through the body 404 of the drum 102. Each longitudinal channel 1001 connects with a plurality of radial channels 401. Each one of the plurality of radial channels 401 connect with at least one degradation assembly 101 disposed on the outer diameter 202 of the drum 102. The channels 401, 1001 may each be drilled into the drum body 404 from the outside. A radial channel 401 may connect a longitudinal channel 1001 with the reservoir via a connector 403 and a fluid hose 402. A single circumferential fluid hose 402 may connect the reservoir 203 with a plurality of longitudinal channels 1001, via a plurality of radial channels 401. The embodiment of FIGS. 10 and 11 may be advantageous in applications where it would be difficult to arrange fluid hoses 402 on the inside of the drum 102, or to reduce maintenance.

Figure 12:
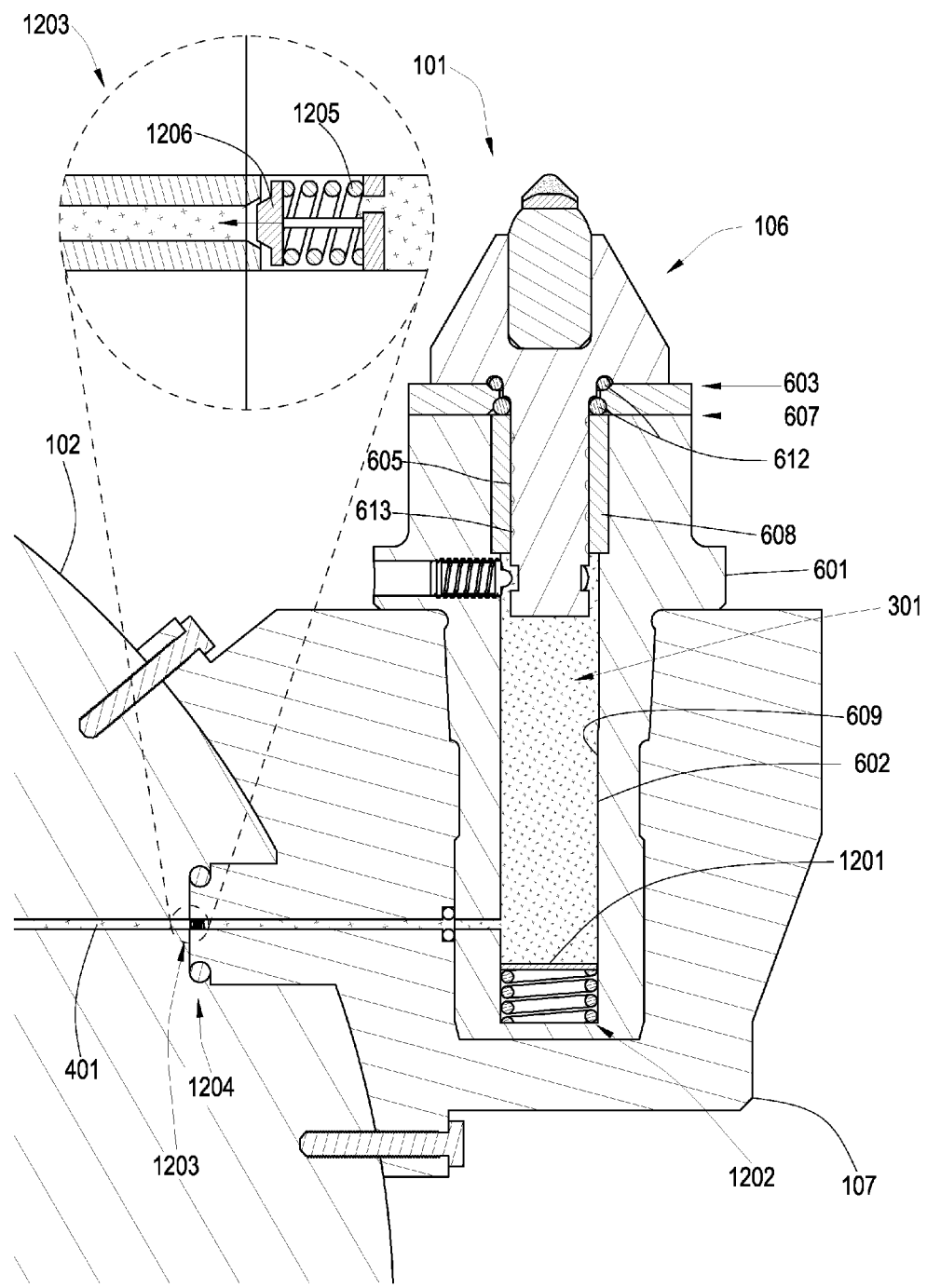
FIG. 12 is cross-sectional diagram of another embodiment of a degradation assembly.

Referring now to FIG. 12, a holder 105 comprises a lubricant pressurizing mechanism 1201, which may be a smaller version of an accumulator element 307. The mechanism 1201 is in fluid communication with at least one lubricant reservoir 203 located in the drum 102 via a fluid pathway 902, at least part of which comprises a radial channel 401 formed in the drum 102. The mechanism 1201 comprises a spring accumulator element 1202 disposed within the bore 602. A check valve 1203 is disposed proximate a junction 1204 of the drum 102 and the block 107. In some embodiments the check valve 1203 may be disposed within a part of the fluid pathway 902 that is located in the drum 102 or the holder 105. The check valve 1203 may restrict movement of lubricant 301 from the holder 105 into the drum, allowing the lubricant to enter the holder 105 from the drum 102 but not allowing the lubricant 301 to flow back into the drum. The check valve 1203 may comprise a resilient spring 1205 and a flexible stopper 1206. When the drum pressure is greater than the holder pressure, the stopper 1206 may be pushed against the resilient spring 1205 and open the valve 1203. When the drum pressure is approximately equal to or less than the holder pressure, the resilient spring may force the stopper 1206 to close the valve 1203, thereby maintaining the holder pressure. This feature may allow the lubricant pressure in the degradation assemblies to be maintained even if the pressure in the main lubricant reservoir 203 is lowered, such as while filling the reservoir 203. This may allow for filling the reservoir 203 during operation of the drum 102, thereby decreasing the down time of the drum, or prevent the fluid pathways 902 from filling with air during filling operations.

Degradation assemblies 101 may be used in various applications. Degradation assemblies 101 may be disposed in a pavement milling machine 103, as in the embodiment of FIG. 1. Other applications that involve intense wear of machinery, such as mining machines, may also benefit from the incorporation of the present invention. Additionally, milling machines may experience wear as they are used to reduce the size of material such as rocks, grain, trash, natural resources, chalk, wood, tires, metal, cars, tables, couches, coal, minerals, chemicals, or other natural resources.

FIG. 13 discloses a flowchart describing a method 1300 for lubricating a degradation assembly. The method comprises a step 1301 of providing a degradation drum 102 comprising inner and outer diameters 201, 202 and a lubricant reservoir 203 disposed within the inner diameter 201. The method 1300 also comprises a step 1302 of attaching a plurality of degradation assemblies 101 to the outer diameter 202 of the drum 102 such that the assemblies 101 are in fluid communication with the lubricant reservoir 201 through a fluid pathway 902. The method 1300 further comprises a step 1303 of maintaining a substantially constant pressure through the fluid pathway 902 on the degradation assemblies 101.

Referring now to FIG. 14, a flowchart describes a method 1400 for providing a cost-effective degradation drum 102. The method 1400 comprises a step 1401 of a first party providing a second party with a generally cylindrical degradation drum 102. The drum 102 comprises inner and outer diameters 201, 202, with a plurality of degradation assemblies 101 disposed on the outer diameter 202. The plurality of degradation assemblies 101 each comprise a pick body 604 disposed intermediate a diamond surface 701 on an impact tip 606 and a pick shank 605. The pick shank 605 is disposed within the bore 602 of a holder 105. The step 1401 of providing the drum 102 may further comprise retrieving a used drum from the second or a third party. The method 1400 further comprises a step 1402 of the first party charging the second party for use of the drum 102. The second party may be charged according to a lease agreement. The second party may be charged for the amount of time they possess the drum 102 or for the volume, area, distance, or weight of material they mill with the drum 102. The second party may be charged for the amount of wear on the drum 102 induced by the second party or occurring on the drum 102 while in their possession.

The drum 102 may be used as part of a pavement milling machine 103 or a mining machine. The first party, the second party, or a third party may be responsible for maintenance of the drum 102. At least one of the plurality of degradation assemblies 101 may comprise a lubricated pick shank 605, which may be in fluid communication with a lubricant reservoir 203 through a fluid pathway 902. At least one of the plurality of degradation assemblies 101 may comprise a bearing assembly disposed intermediate the holder and the shank 605. Each of the plurality of degradation assemblies 101 may be individually replaceable.

The method 1400 may further comprise a step of filling a lubricant reservoir 203 with a lubricant 301, or of filling the reservoir 203 while the drum 102 is in operation. The method 1400 may comprise a step of maintaining the drum 102 by replacing worn picks 106 and/or degradation assemblies 101. The step 1401 of providing the drum may further comprise recycling the impact tip 606. This may be accomplished by removing a carbide core 705 and the impact tip 606 to which it is attached from a used pick body 604 and attaching the core 705 and the tip 606 to another pick body 604 that may be inserted into a degradation assembly 101.

Whereas the present invention has been described in particular relation to the drawings attached hereto, it should be understood that other and further modifications apart from those shown or suggested herein, may be made within the scope and spirit of the present invention.

What is claimed is:

1. A method for providing a cost effective degradation drum, comprising:
    providing by a first party to a second party a generally cylindrical degradation drum comprising inner and outer diameters and a plurality of degradation assemblies disposed on the outer diameter, the plurality of degradation assemblies each comprising a pick body intermediate an impact tip comprising diamond and a pick shank, the pick shank being disposed within a bore of a holder;
    charging the second party by the first party for use of the drum; and
    reusing the impact tips in another pick body.

2. The method of claim 1, wherein the second party is charged for the amount of time they possess the drum.

3. The method of claim 1, wherein the second party is charged for the volume or area of material they mill with the drum.

4. The method of claim 1, wherein the second party is charged for the distance of material that they mill with the drum.

5. The method of claim 1, wherein the second party is charged for the weight of the material that they mill with the drum.

6. The method of claim 1, wherein the second party is charged for the amount of wear they induce on the drum.

7. The method of claim 1, wherein the step of providing a drum further comprises retrieving a used drum from the second party.

8. The method of claim 1, wherein the drum is used as part of a pavement milling machine.

9. The method of claim 1, wherein the drum is used as part of a mining machine.

10. The method of claim 1, wherein the first party or a third party is responsible for maintenance of the drum.

11. The method of claim 1, wherein the second party is responsible for maintenance of the drum.

12. The method of claim 1, wherein at least one of the plurality of degradation assemblies comprises a lubricated pick shank.

13. The method of claim 1, wherein at least one of the plurality of degradation assemblies comprises a bushing disposed intermediate the holder and the shank.

14. The method of claim 1, wherein the impact tip comprises diamond, polycrystalline diamond, refractory metal bonded diamond, silicon bonded diamond, layered diamond, infiltrated diamond, thermally stable diamond, natural diamond, vapor deposited diamond, physically deposited diamond, diamond impregnated matrix, diamond impregnated carbide, cemented metal carbide, chromium, titanium, aluminum, tungsten, or combinations thereof.

15. The method of claim 1, wherein each of the plurality of degradation assemblies is individually replaceable.

16. The method of claim 1, wherein the method further comprises a step of filling a lubricant reservoir.

17. The method of claim 1, wherein the method further comprises a step of maintaining the drum by replacing worn picks and/or degradation assemblies.

18. A method for providing a cost effective degradation drum, comprising:
    providing by a first party to a second party a generally cylindrical degradation drum comprising inner and outer diameters and a plurality of degradation assemblies disposed on the outer diameter, the plurality of degradation assemblies each comprising a pick body intermediate an impact tip comprising diamond and a pick shank, the pick shank being disposed within a bore of a holder;
    renting the drum to the second party by the first party according to a rental agreement; and
    reusing the impact tips in another pick body.

19. A method for providing a cost effective degradation drum, comprising:
    providing by a first party to a second party a generally cylindrical degradation drum comprising inner and outer diameters and a plurality of lubricated degradation assemblies disposed on the outer diameter, the plurality of lubricated degradation assemblies each comprising a pick body intermediate an impact tip comprising diamond and a pick shank, the pick shank being disposed within a lubricated bore of a holder; and
    charging the second party by the first party according to a rental agreement; and
    reusing the impact tips in another pick body.

* * * * *